United States Patent Office 2,783,529
Patented Mar. 5, 1957

2,783,529

POWDERED METAL FRICTION ELEMENTS

Howard B. Huntress, Suffern, N. Y., assignor to American Brake Shoe Company, Wilmington, Del., a corporation of Delaware No Drawing. Application January 8, 1954,
Serial No. 403,060

4 Claims. (Cl. 29—182.5)

This invention relates to powdered metal friction elements of the type which are employed in the brakes of automative vehicles including buses, trucks, and passenger cars, as well as in clutch facings and like friction elements.

In seeking to produce improved friction elements of the above type, the art in recent years has resorted to the art of powder metallurgy and accordingly has produced friction elements from pressed and sintered metal powders by means of the usual powdered metal techniques. This practice provides an extremely tough and durable friction element that satisfies many requirements not met by the usual or so-called bonded composition friction element, chief among such requirements being high mechanical strength and durability, ability to withstand extremely heavy loading, uniform thermal characteristics, and resistance to generated heat.

Sintered friction parts thus produced are composed of a metallic matrix in which other powdered material may be readily dispersed, such including lead, carbon usually in the form of graphite, iron, and silica which serves as an abrasive acting between the engaging surfaces. However, the wear resistance that is sometimes afforded by the powdered iron alone has not been altogether satisfactory, and similarly while there are some additives capable of modifying and increasing friction characteristics, this latter has usually been attained only at the sacrifice of wear resistance.

Accordingly, the primary object of the present invention is to increase the wear resistance of powdered metal friction elements of the above type without adversely effecting the coefficient of friction. A further object of the present invention is to increase the wear resistance of powdered metal friction elements of the above type by compounding the same with molybdenum oxide in finely divided form with or without the addition of an abrasive oxide.

Another defect with certain powdered metal friction elements of the prior art has been a marked tendency toward the formation of a glaze surface, not only on the friction surface of the friction element itself but also on the metallic surface that is engaged by it. This condition is primarily manifest in a rapid loss of friction and a scoring of the friction surface of the friction element as particles of the latter deposit on and are picked off by the opposite engaged surface. It is therefore another object of the present invention to prevent loss of friction or so-called "fade" in powdered metal friction elements, and to prevent the formation of glaze surfaces and "pick-up" of metal particles.

Because of the demands in the form of severe service conditions that are placed on a powdered metal friction element when in use, the composition of such element must be selected first to resist and endure the forces that will normally be working against it. One composition that has been found to be generally satisfactory for most purposes has been a mixture of powdered copper and tin in which copper largely predominates. These metal powders are first pressed together under extremely high pressures, in the neighborhood of 15 to 20 tons per square inch, to form a highly compacted, self-sustaining but brittle member in the form of a so-called briquette possessing the necessary dimensions and shape of the friction element. The briquette thus produced is then sintered at a temperature below the melting points of the metals, around 1400° F.; and preferably in a reducing atmosphere, usually carbon monoxide, to produce an alloy bonding, at least at the interface, between adjacent copper and tin powder particles. This second operation results in a tough, rigid and durable friction element the strength of which is believed to be in the aforementioned alloy bond, and the friction element thus produced is usually attached to a supporting plate.

A degree of porosity exists in the finished product, and in this connection it has been found desirable to add other materials to the composition, prior to the compression thereof to form a briquette, which will add properties of their own to the friction element. Thus, neither lead, carbon in the form of graphite, nor iron will alloy with copper appreciably during the sintering step, and therefore these elements can be included in the powdered metal mixture to impart properties of their own to the finished product. It has also been proposed to incorporate silica in the friction element to provide more friction at the engaging face of the element. However, it has been observed that the addition of silica has a tendency, among other things, to weaken the body of the friction element.

Under and in accordance with the present invention, I have found that the inclusion of a relatively small amount of finely divided molybdenum oxide in the powdered metal friction element greatly increases the wear resistance without detracting in any way from the frictional characteristics, and in fact the latter is improved. Molybdenum oxide in powdered form is simply mixed with the other powdered and finely divided ingredients that are used in the composition and this mixture is then subjected to the usual powdered metal practice that has been briefly outlined above.

There is an instance in the prior art of the use in a powdered metal element of molybdenum sulfide in particle form for improving friction, and it is there theorized that the sulfide converts to the oxide as a result of high temperatures engendered during use of such friction element. However, the necessary conditions for converting the sulfide entirely to the oxide are not, as a general rule, established in friction application, and instead of such conversion occurring a glaze layer originating through the molybdenum sulfide tends to collect on the surface of the friction element which eventually adversely affects friction. I have actually observed the development of this layer which is black, shiny and slippery and have seen friction drop after only a few engagements from 0.3 to 0.16 in friction materials containing molybdenum sulfide. Moreover, where such conversion from the sulfide to oxide does take place, the conditions accompanying this reaction are of such order as to tend to effect a disruption and cause radial cracking on the surface, and it is believed that the spalling and the relatively rapid wear observed in such elements is caused, in part at least, by this change.

Two examples of basic compositions to which powdered molybdenum oxide may be added in accordance with the present invention are as follows:

*Example I*

| Powdered metal ingredient | Parts by weight | Weight percent |
| --- | --- | --- |
| Copper | 71 | 78.9 |
| Tin | 8 | 8.9 |
| Lead | 6 | 6.7 |
| Graphite (source of carbon) | 5 | 5.5 |
| Total | 90 | 100.0 |

*Example II*

| Powdered metal ingredient | Parts by weight | Weight percent |
| --- | --- | --- |
| Copper | 71 | 78.9 |
| Tin | 8 | 8.9 |
| Lead | 3 | 3.3 |
| Graphite (source of carbon) | 8 | 8.9 |
| Total | 90 | 100.0 |

The graphite in each of the above two examples is domestic type composed of large, coarse flake-like particles as distinguished from the other type of graphite which is of a much finer, soot-like nature, this being so because on a comparative basis I have found that the first type of graphite possesses superior resistance to wear.

In general, under and in accordance with the present invention, it is necessary to use over about 2% by weight of molybdenum oxide with either of the above examples in order to obtain some appreciable degree of improved wear resistance and improved frictional characteristics. However, on the other hand, the amount of molybdenum oxide should not exceed about 8% by weight since there appears to be no further benefits conferred by addition beyond this amount.

The procedure for producing friction elements from the above typical compositions, to which various amounts of molybdenum oxide are added within the limits noted, is a conventional one, well known in the art, and it is not believed necessary, therefore, to reproduce in detail the various steps to be followed and conditions to be maintained in connection therewith. It will suffice simply to point out that after mixing the various ingredients together, the mixture is pressed to a suitable density to form a briquette in the usual fashion, and the briquette then sintered at a temperature (1450° F.) somewhat below the melting point of the principal components (copper and tin) preferably in a reducing atmosphere. The finished sintered product thus prepared is then attached to a face of a ferrous backing plate serving as a support to complete the assembly of the friction member having the sintered metal product as the wear surface.

In order to demonstrate the superior wear resistance of powdered metal friction elements compounded and produced in accordance with the present invention as set forth above, several friction elements using different amounts of molybdenum oxide as added to the basic composition of Example I were subjected to a comparison test against a control powdered metal friction element produced from the composition set forth in Example I above, no molybdenum oxide being incorporated in the test or control piece. The results of this comparison are as follows, the tests being carried out at 75 p. s. i. pressure, 3000 f. p. m. speed and 500° F. drum temperature on the friction machine:

| Parts by weight $MoO_3$ to Example I | Coefficient of friction | Wear in inches (equal time) | Wear in inches (equal energy) |
| --- | --- | --- | --- |
| 0 | 0.30 | 0.0190 | 0.0190 |
| 1 | 0.325 | 0.0170 | 0.0157 |
| 2 | 0.35 | 0.0150 | 0.0128 |
| 4 | 0.39 | 0.0130 | 0.0100 |
| 6 | 0.42 | 0.0115 | 0.0082 |
| 8 | 0.435 | 0.0110 | 0.0076 |

It will be recognized from the above table that powdered metal friction elements embodying a minor proportion of molybdenum oxide under and in accordance with the present invention display superior wear resistance to friction elements not utilizing molybdenum oxide as a component of the mixture.

Where it is desired to further increase friction, this is readily accomplished by adding finely divided feldspar or silica in a desired amount, usually not over about 3 parts by weight, to mixes such as set forth in Examples I and II which of course also include molybdenum oxide. Other abrasive oxides selected from the class to which silica and feldspar belong may be utilized for the same purpose if desired.

Friction elements presenting wear surfaces produced in accordance with this invention exhibt no surface cracking and do not tend to split off from a steel backing member to which they are attached. In use, there is no spalling on the friction face of the element, and in this connection it should also be pointed out that the friction face continues to remain free of glaze, accompanied by the lack of any "pick up" on the face of the opposing member. Consequently, the friction level does not drop off or "fade" in use of the friction element and there is substantially no scuffing or scoring of the friction face.

I claim:

1. A sintered powdered-metal friction element having dispersed uniformly therethrough finely divided molybdenum oxide in an amount not substantially less than two percent nor substantially more than eight percent by weight.

2. A friction element according to claim 1 and additionally composed of powdered copper, tin, lead and graphite.

3. A sintered powdered-metal friction element having dispersed uniformly therethrough finely divided molybdenum oxide in an amount not substantially less than two percent nor substantially more than eight percent by weight, and additionally composed of an abrasive oxide in finely divided form.

4. A friction element according to claim 3 and additionally composed of powdered copper, tin, lead and graphite.

No references cited.